US007899162B2

(12) United States Patent
Wu et al.

(10) Patent No.: US 7,899,162 B2
(45) Date of Patent: Mar. 1, 2011

(54) APPARATUS AND METHOD FOR REPORT SHARING WITHIN AN INSTANT MESSAGING FRAMEWORK

(75) Inventors: Ju Wu, Coquitlam (CA); Hlaing Than, Richmond (CA); Patrick Yee Cheuk Cheng, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 1274 days.

(21) Appl. No.: 11/394,641

(22) Filed: Mar. 31, 2006

(65) Prior Publication Data

US 2007/0266088 A1 Nov. 15, 2007

(51) Int. Cl.
*H04M 11/00* (2006.01)
(52) U.S. Cl. .................. 379/90.01; 379/93.25; 709/205
(58) Field of Classification Search .............. 379/90.01, 379/93.04, 93.05, 93.06, 93.25; 709/201, 709/204–205, 223, 227; 715/201, 205, 230, 715/512, 854
See application file for complete search history.

(56) References Cited

U.S. PATENT DOCUMENTS

| | | | | |
|---|---|---|---|---|
| 7,149,776 B1* | 12/2006 | Roy et al. | | 709/205 |
| 7,370,269 B1* | 5/2008 | Prabhu et al. | | 715/230 |
| 2004/0054802 A1 | 3/2004 | Beauchamp et al. | | |
| 2004/0215610 A1 | 10/2004 | Dixon et al. | | |
| 2004/0252134 A1 | 12/2004 | Bhatt et al. | | |
| 2005/0188016 A1* | 8/2005 | Vdaygiri et al. | | 709/205 |
| 2006/0010197 A1 | 1/2006 | Ovenden | | |
| 2006/0026145 A1 | 2/2006 | Beringer et al. | | |
| 2006/0026231 A1 | 2/2006 | Degenhardt et al. | | |
| 2006/0026235 A1 | 2/2006 | Schwartz et al. | | |
| 2006/0041844 A1 | 2/2006 | Homiller | | |

FOREIGN PATENT DOCUMENTS

EP 1075119 2/2001

OTHER PUBLICATIONS

Winder, Patrice L., U.S. Appl. No. 11/488,459 Office Action dated Sep. 15, 2009, 9 pages.
Winder, Patrice L., U.S. Appl. No. 11/488,463 Office Action dated Dec. 1, 2009, 12 pages.

* cited by examiner

*Primary Examiner*—Melur Ramakrishnaiah
(74) *Attorney, Agent, or Firm*—Cooley LLP

(57) ABSTRACT

A computer readable medium includes executable instructions to facilitate an instant messaging conversation between a first computer and a second computer on a network. A first request for a report specified by the user of the first computer is processed. A first portion of the report is returned to a first output device of the first computer and a second output device of the second computer. An interaction signal characterizing an interaction with the first portion of the report is processed to produce a second portion of the report. The second portion of the report is routed to the first output device of the first computer and the second output device of the second computer.

11 Claims, 10 Drawing Sheets

APPARATUS AND METHOD FOR REPORT SHARING WITHIN AN INSTANT MESSAGING FRAMEWORK

CROSS-REFERENCE TO RELATED APPLICATIONS

This application is the parent of the following continuation-in-part applications: "Apparatus and Method for Report Sharing within an Instant Messaging Framework", Ser. No. 11/488,459, filed Jul. 17, 2006 and "Apparatus and Method for Report Sharing within an Instant Messaging Framework", Ser. No. 11/488,463, filed Jul. 17, 2006.

BRIEF DESCRIPTION OF THE INVENTION

This invention relates generally to reporting and instant messaging. More particularly, this invention relates to sharing a report document in an interactive manner.

BACKGROUND OF THE INVENTION

Instant messaging refers to real time communication between two or more people over a network, such as the Internet. A user requires a client program and a connection to an instant messaging service. Usually the instant messaging service is administered by an instant messenger server. The composition and function of these servers are well known in the art. Once connected to an instant messaging service, users can send messages, including text and graphics, in real time. The activity is often referred to as "chatting". A conversation can be held with two or more people on the same computer, network, or across the internet.

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

To date, instant messaging, business intelligence, and particularly report generation techniques, have operated in different domains. It would be desirable to provide techniques to integrate these separate domains.

SUMMARY OF INVENTION

The invention includes a computer readable medium with executable instructions to facilitate an instant messaging conversation between a first computer and a second computer on a network. A first request for a report specified by the user of the first computer is processed. A first portion of the report is returned to a first output device of the first computer and a second output device of the second computer. An interaction signal characterizing an interaction with the first portion of the report is processed to produce a second portion of the report. The second portion of the report is routed to the first output device of the first computer and the second output device of the second computer.

The invention also includes a computer readable medium with executable instructions to be executed by a first computer with a first user. The executable instructions include instructions to support at the first computer an instant messaging conversation between the first user and a second user on a second computer. Report content is displayed on a first output device of the first computer. The second computer is sent information about the report content to allow the display of the report content on a second output device of the second computer. Revised report content is then displayed on the first output device of the first computer.

The invention also includes a computer implemented method, including sending a request for report content to a report server, processing the request for the report content, serving the report content to a first computer and a second computer, displaying a first view of the report content on a first output device of the first computer and a second output device of the second computer, transmitting a signal specifying a second view of the report content via an instant messaging protocol, and displaying the second view of the report content on the first output device of the first computer and the second output device of the second computer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
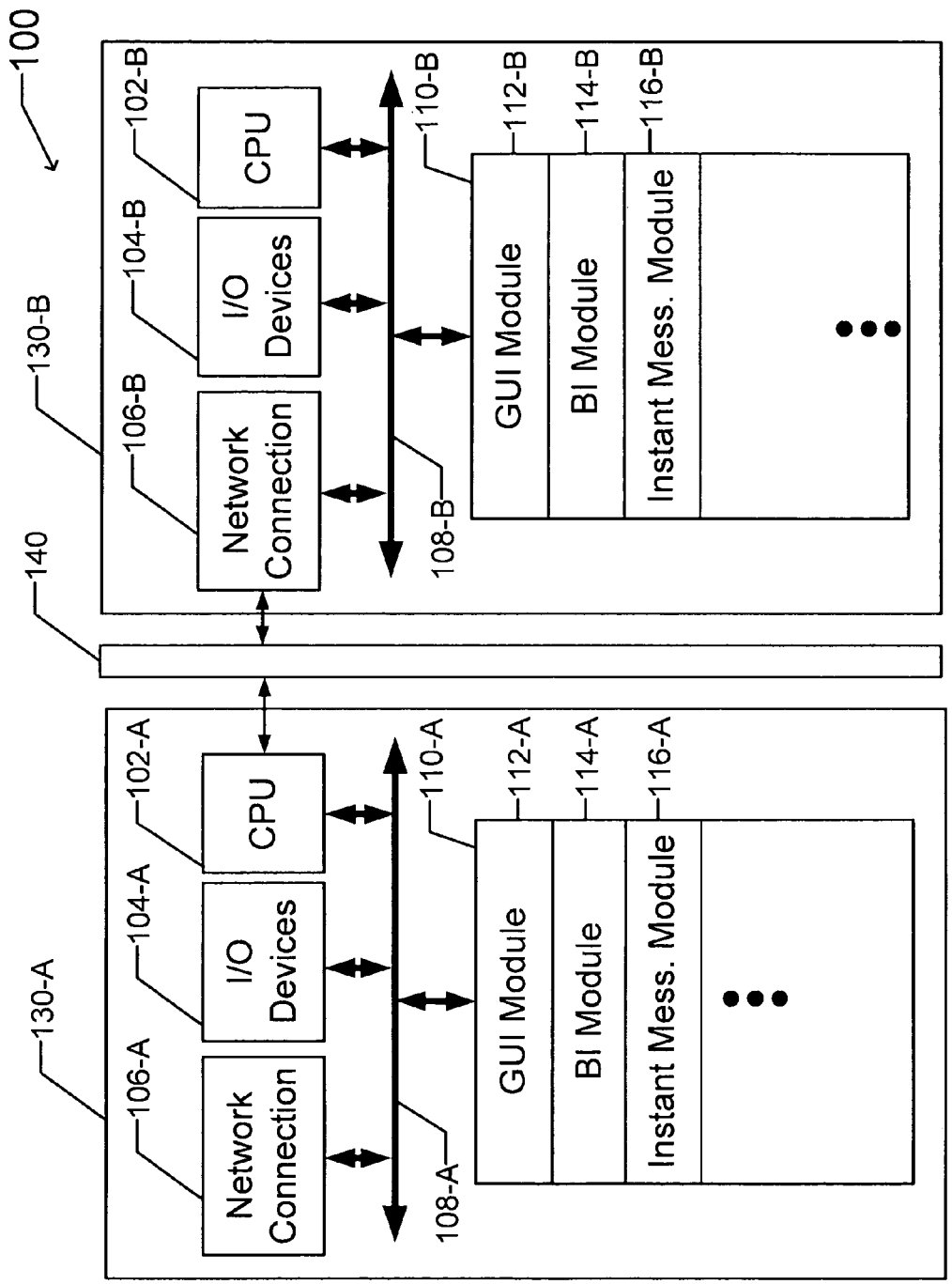
FIG. 1 illustrates a system 100 configured in accordance with an embodiment of the invention.

FIG. 1 illustrates a system 100 configured in accordance with an embodiment of the invention. The system 100 includes one or more coupled computers, e.g., arranged in a peer-to-peer architecture. The system 100 includes a first computer 130-A, and a second computer 130-B. A data signal embodied in a carrier wave can be sent from the first computer, via communication channel 140, to the second computer and vice versa.

Each computer 130 includes a central processing unit 102 connected to a set of input/output devices 104 and a network connection circuit 106 via a bus 108. As shown in FIG. 1, computer 130-A includes a CPU 102-A, input/output devices 104-A, a network connection circuit 106-A, and a bus 108-A, while computer 130-B includes a CPU 102-B, input/output devices 104-B, a network connection circuit 106-B, and a bus 108-B. For the purpose of simplicity, individual components, e.g., 102-A and 102-B, are collectively referenced only by their number, e.g., 102.

The input/output devices 104 may include standard components, such as keyboard, mouse, display, printer, and the like. The network connection 106 provides connectivity to communication channel 140.

Also connected to the bus 108 is a memory 110. The memory 110 stores executable instructions to implement operations of the invention. In an embodiment the memory 110 stores one or more of the following modules: a Graphical User Interface (GUI) module 112, a BI module 114, and an instant messaging module 116.

The GUI module 112 may rely upon standard techniques to produce graphical components of a user interface, e.g., windows, icons, buttons, menus and the like, examples of which are discussed below. The user interface may include instructions to receive input from a pointer device and display a cursor on an output device.

The BI module 114 includes executable instructions to perform BI related functions on computers 130-A or 130-B, or across network 140 or a wider network. BI related functions include: generating reports (locally or on a server), viewing a report, performing query and analysis, and the like. In an embodiment, the BI module 114 can include a report module, a server communications module, and the like, as sub-modules.

The instant messaging module 116 includes executable instructions to implement an instant messaging conversation between two or more parties across network 140 or a wider network.

The modules stored in system memory 110 are exemplary. Additional modules such as an operating system can be included. It should be appreciated that the functions of the presented modules may be combined. In addition, a function of a module need not be performed on a single machine, e.g., the first computer or the second computer. Instead, the function may be distributed across system 100 or a wider network, if desired. In an embodiment of the present invention, the system 100 may operate in a non-peer-to-peer architecture unifying all or part of the operations associated with the computers of system 100.

Figure 2:
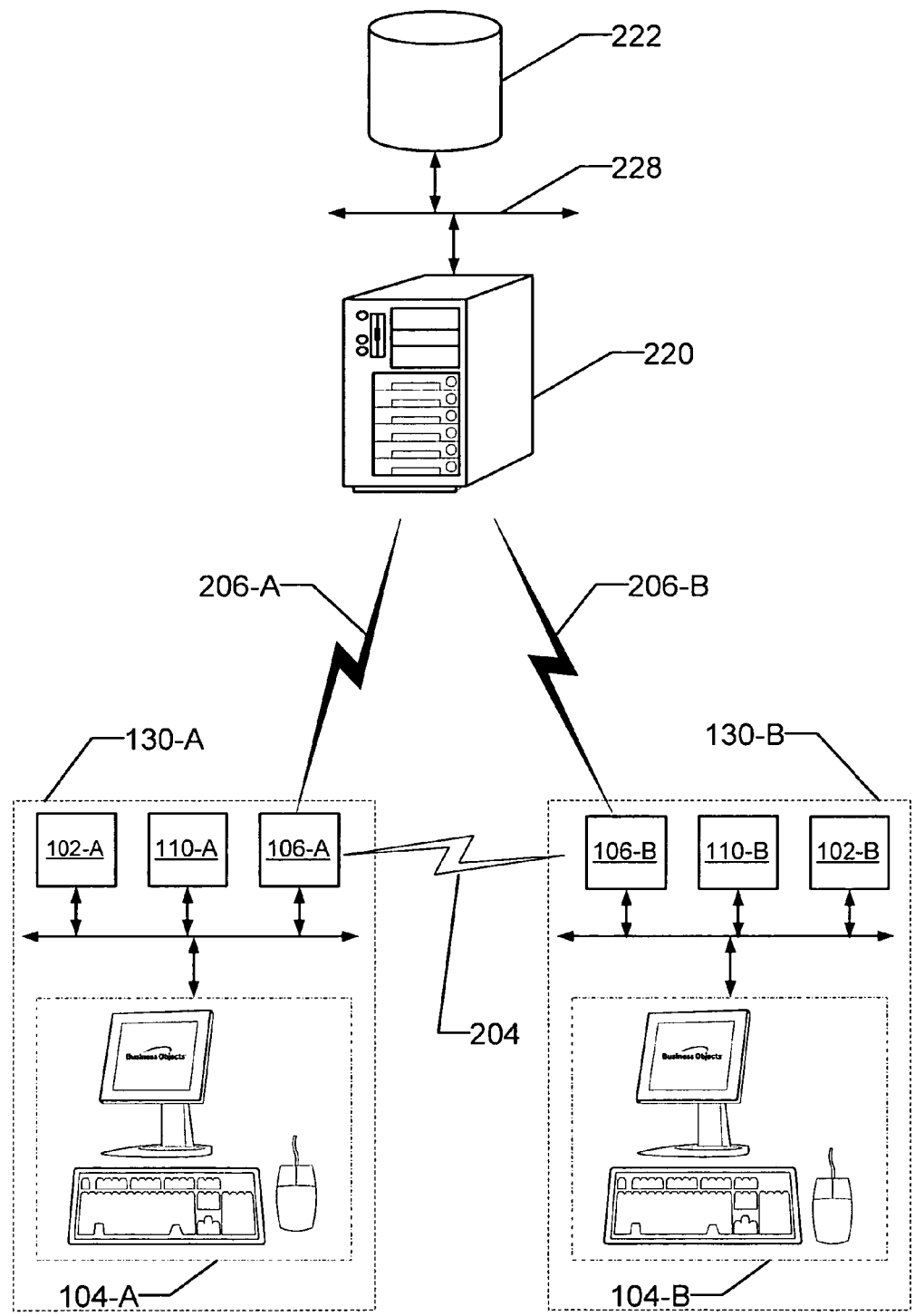
FIG. 2 illustrates a network architecture configured in accordance with an embodiment of the invention.

FIG. 2 illustrates a network architecture in accordance with an embodiment of the invention. Computers 130-A and 130-B of FIG. 1 are coupled by a carrier wave 204. These computers are also coupled by carrier waves 206-A and 206-B to a server 220. The server 220 includes standard computing components for storing and processing of reports. The server can be coupled to a datastore 222 via bus 228.

The input/output devices 104 of computers 130-A and 130-B can include input devices such as a keyboard 240, mouse 242, and monitor 244. In addition input/output devices 104 may include input/output devices such as handwriting recognition tablets, touch screen displays, scanners, printers, and the like. Indeed, in an embodiment either of computers 130-A and 130-B could be replaced by smaller computing device, such as, a handheld computer. In an embodiment the role of the server 220 and one of the computers 130-A or 130-B can be combined.

Figure 3:
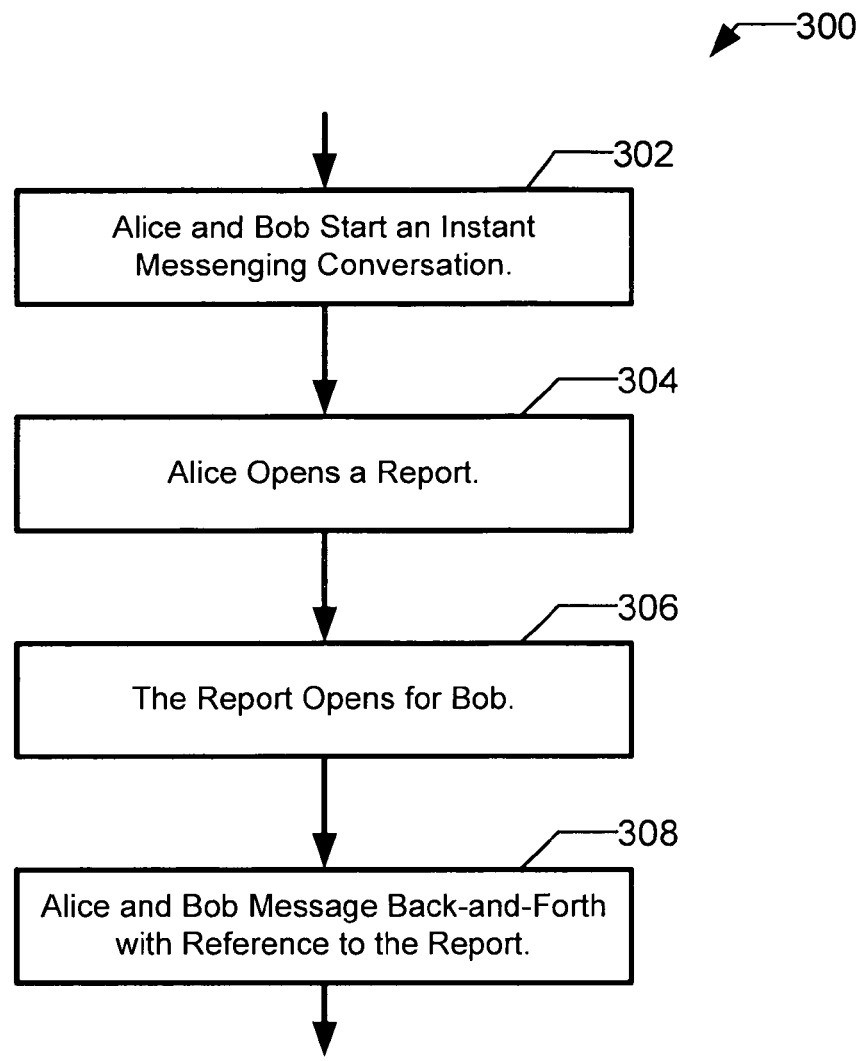
FIG. 3 illustrates a series of processing operations associated with an embodiment of the invention.

FIG. 3 illustrates a series of processing operations associated with an embodiment of the invention. In the first processing operation of FIG. 3, a plurality of users start an instant messaging conversation 302. For the purposes of illustration the plurality of users can be replaced, without limitation, by two users, traditionally personified as "Alice" and "Bob" representing user A and user B.

In processing operation 304, Alice opens a report such that it is displayed on an output device of her computer, 130-A. She can specify that the report be displayed for Bob on his computer 130-B. The specification can be based on a user input from Alice, or be inferred by system 200 from the fact Alice is engaged in an instant messaging conversation with Bob. The displaying of a report on an output device of either Alice or Bob's computer is done in conjunction with the instant messaging module 116. The module communicates that Bob's computer should display the report. In processing operation 306, the report is displayed for Bob on an output device on his computer 130-B.

In an alternative embodiment, Alice has the report open before the start of the instant messaging conversation of operation 302 and requests that the report be displayed on Bob's computer. In an embodiment, Alice communicates to Bob a unique identifier of the report via the instant messaging channel. Using the unique identifier, Bob opens the report on his computer 306.

Figure 4:
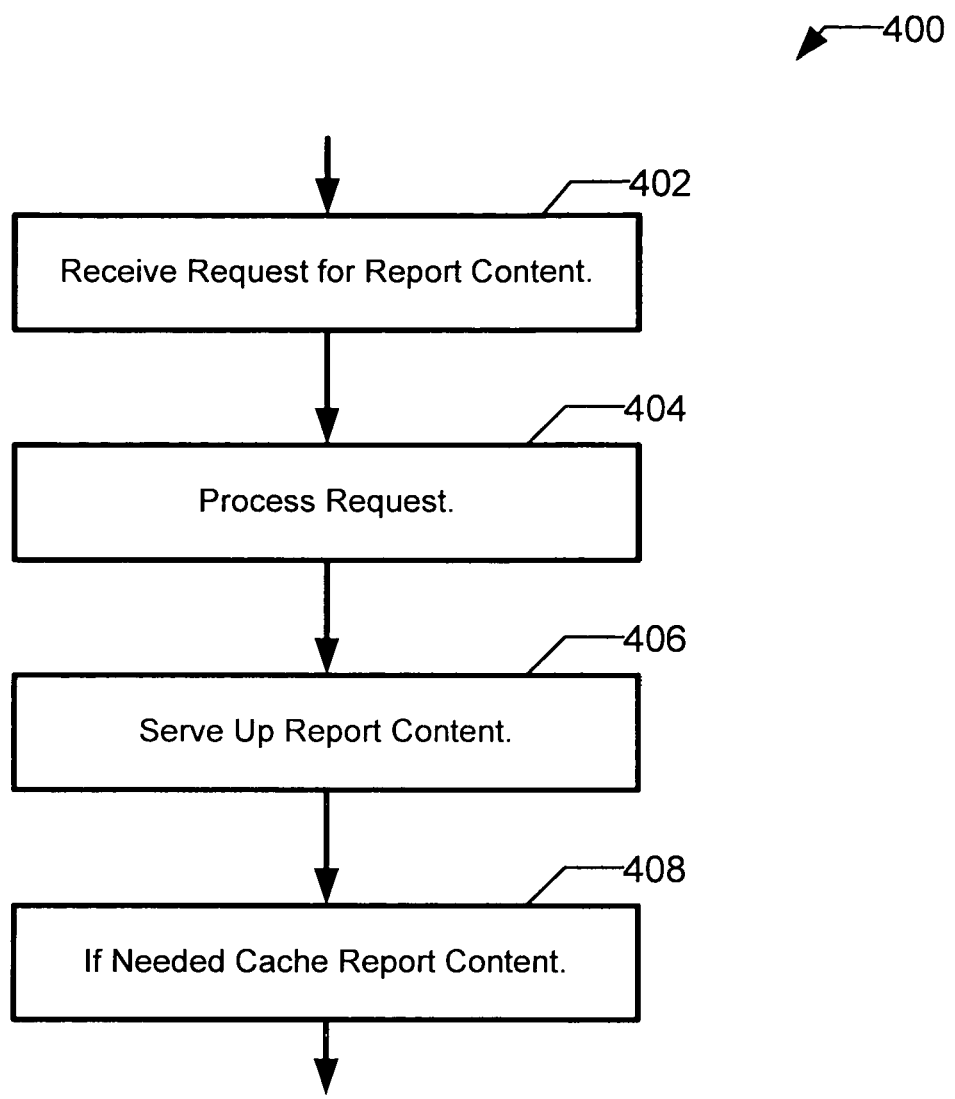
FIG. 4 illustrates a series of processing operations associated with an embodiment of the invention.

FIG. 4 illustrates a series of processing operations associated with an embodiment of the invention. In the first processing operation of FIG. 4, a report server receives a request for report content 402. The server processes the request 404. In the case where the request is for a report, the processing can include retrieving the report from storage, or creating the report by accessing data from a datastore, e.g., datastore 222, and formatting the data per the report's schema. In the case where the request is for a portion of a previously generated report, the processing can include retrieving the portion of the report from storage. In some cases the portion of the report is created; the portion of the report could be contained in a generated sub-report. Actions of a user that can lead to a request for report content include, opening a report, paging down, drilling down on an item in the report, searching through a report, providing a parameter, refreshing a report, or entering a sub-report.

In processing operation 406, the server serves up the report content to the users that have requested it or are to receive it by request of another user. For example, Alice can request a report for herself and Bob. The server in serving up the report will compare the user's security permissions against the report content and route the report accordingly for each user. In serving up the report contents, the server may elect to transmit to the users only the report content they immediately need. That is, while the full contents of the report may be created only a subset of the report content is sent to the users for performance reasons. The server can, in optional processing operation 408, cache the report contents it created in the foregoing operations of FIG. 4.

Figure 5:
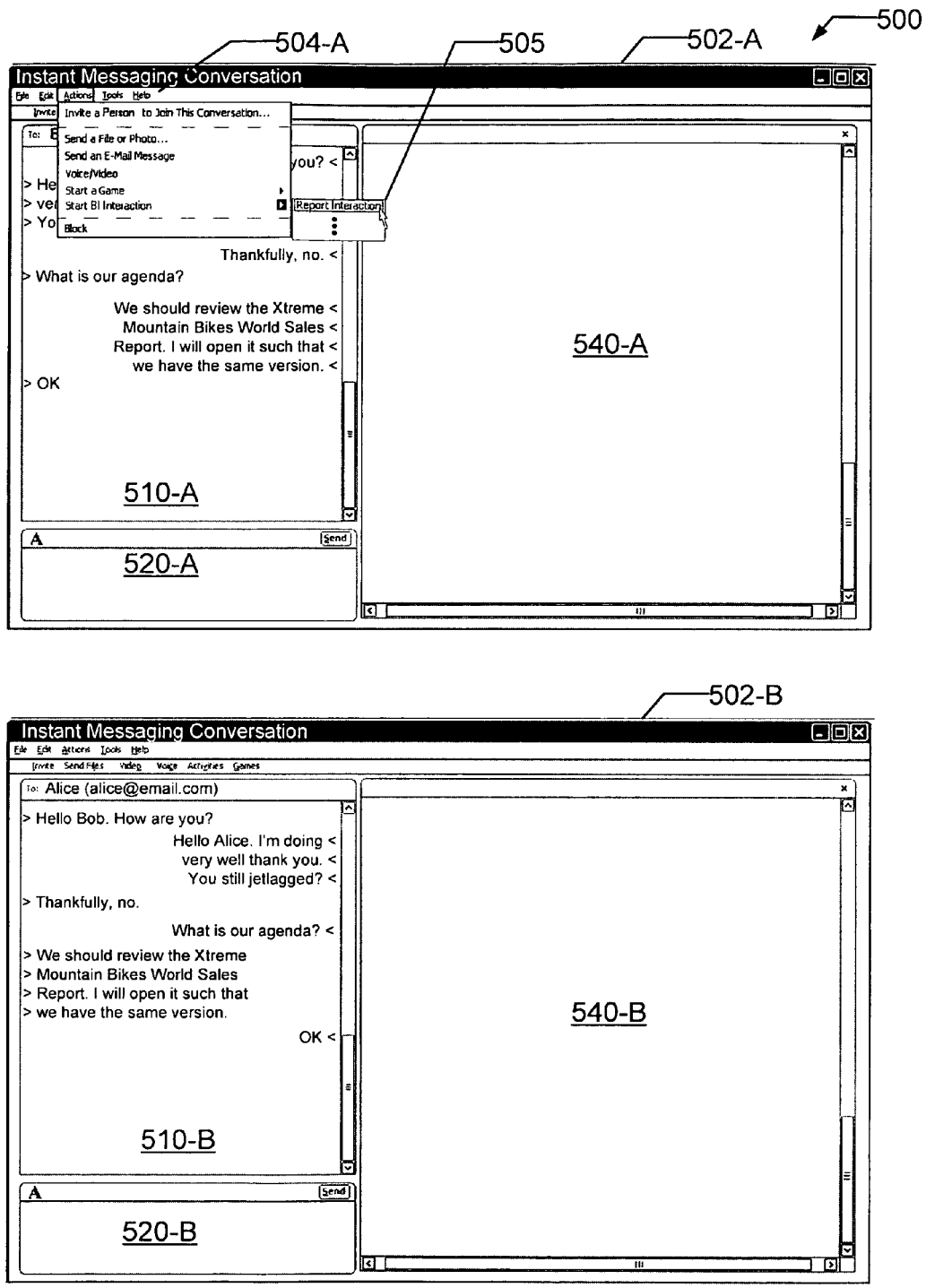
FIG. 5 illustrates two graphical user interfaces (GUIs) that may be utilized in accordance with an embodiment of the invention.

FIG. 5 illustrates two graphical user interface (GUI) 500 windows 502-A and 502-B. Windows 502-A and 502-B belong to Alice and Bob respectively. The GUIs include many standard features. For example, the windows 502-A and 502-B, collectively 502, include a menu bar 504. The windows each include a conversation digest pane 510, i.e., 510-A and 510-B. The second pane in window 502 is an input pane 520, where Alice and Bob enter their text messages for each other.

The GUIs include features configured in accordance with aspects of the invention. The third pane in windows 502 is the report pane 540. Here the contents of a report are displayed and interacted with. Also, an interface for logging on to a report server, searching through a report, displaying help information, and the like can be displayed in the report pane 540. The report pane 540 can also contain a non-report document. In an embodiment, the report pane 540 is a shared workspace for Alice and Bob where many reports and non-report documents can be interacted with at once.

FIG. 5 also illustrates a work flow associated the invention. Specifically, an example of the processing operations 302 and 304 of FIG. 3 is shown in FIG. 5. Alice and Bob start an instant messing conversation. This conversation: "Hello Bob. How are you?"; "Hello Alice . . . . "; et seq., is recorded in the conversation digest panes 510-A and 510-B. Alice opens a report by the user input action of clicking on the "Actions" menu on menu bar 504-A, in her window 502-A, and then clicking on, in sequence, "Start BI Interaction" and "Report Interaction", in sub-menu 505. Alice then selects a report to be opened (not shown).

The report is then displayed on an output device of Alice's computer and Bob's computer. In an embodiment, Alice's user input can be converted into a signal sent to a report server. The signal would be a request for report content having the following meaning: "please provide Alice and Bob with report X". In an embodiment, Alice's user input can be converted into a signal sent to Bob's computer. The signal would specify the report and if need be the report server for Bob to access. For example, the signal could have the following meaning: "please request report X from server Y". Alternatively, Alice can pack the report into a format suitable for transmission to Bob. The report can include all the ancillary data Bob needs to interact with the report. This may be implemented using the techniques described in the commonly owned patent application entitled "Apparatus and Method for Transporting Business Intelligence Objects between Business Intelligence Systems", Ser. No. 11/303,039, filed Dec. 14, 2005, the contents of which are incorporated herein by reference.

Figure 6:
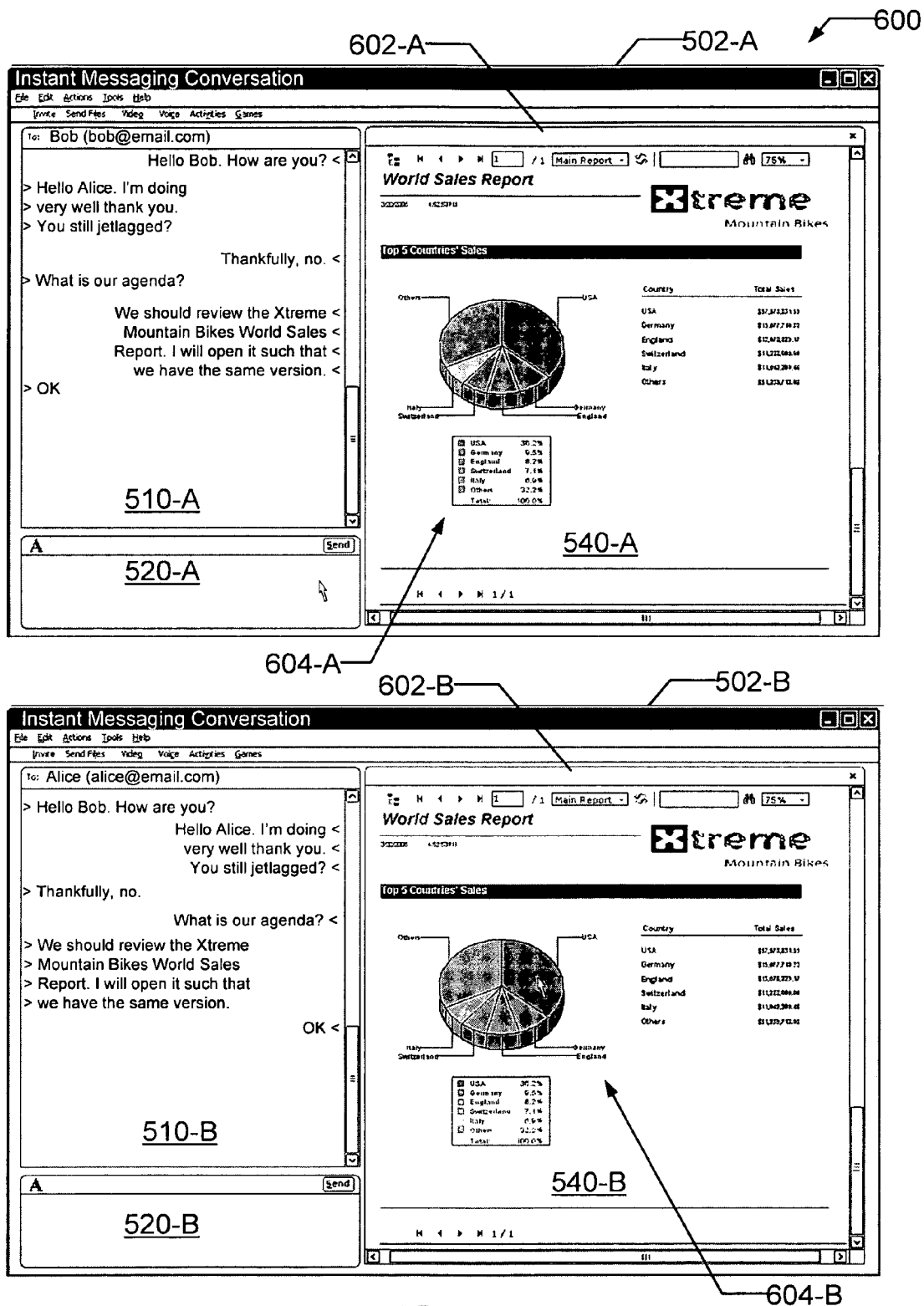
FIG. 6 illustrates a workflow involving the GUIs of FIG. 5.

FIG. 6 illustrates a workflow involving the GUIs of FIG. 5. A report that Alice specified is displayed for both her and Bob. The report 602 is displayed in both of their report panes 540. Either Alice (the user who specified) the report, or Bob (the other user) can interact with the report. Interactions with a report include manipulating pieces of the report, navigating through a report by changing the page, and drilling down or up within the report. The paging operations include a page up operation and a page down operation. An example of a drill down operation is shown in FIG. 6. Using his cursor, Bob can drill down on a segment of the pie chart 604 displayed in the report 602.

Figure 7:
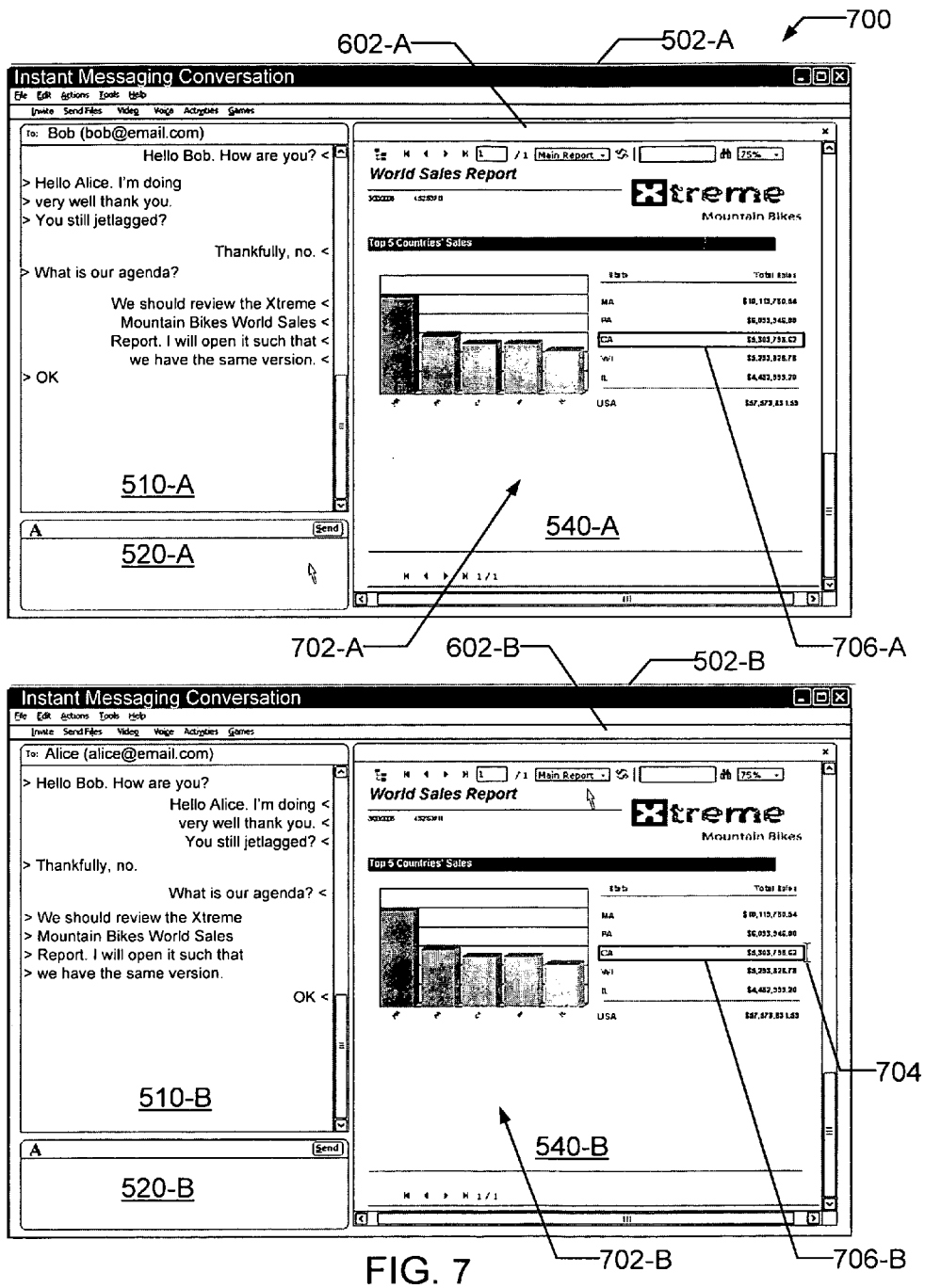
FIG. 7 illustrates a workflow involving the GUIs of FIG. 5.

FIG. 7 illustrates a workflow involving the GUIs of FIG. 5, and is the result of Bob's user input of FIG. 6. Bob drilled down on a segment of the pie chart 604, specifically he clicked on the "USA" segment. With Bob's user input a signal specifying Bob's interaction with the report 602 is automatically generated. The signal would have the following meaning: "please look at the details of pie segment 'USA'". This signal is sent to Alice's computer. In an embodiment, the signal could include the following information: action="drill down", name="graph 1", coord="20-90", page_number="1", and next_part="page2". Using the signal Alice can create the same view of the report as Bob. That is, it is as if she had clicked on the same segment of pie chart 604. In addition to this signal Alice and Bob could be using the instant messaging system to send text messages back and forth with comments on the report.

FIG. 7 provides an illustration of an aspect of the invention. The interaction with the report can occur on an unsecured channel. Because the signal specifying Bob's interaction with the report 602 contains no confidential report data, the transmission can be over an unsecured channel. The signal can be transmitted by the instant messaging module. In an embodiment, computers 130-A and 130-B of FIG. 2 are coupled by a carrier wave 204 over an unsecured channel. In an embodiment, these computers are coupled to a server 220 by carrier waves 206-A and 206-B that are on a secured channel.

FIG. 7 provides an illustration of another aspect of the invention. Report sharing in an instant messaging framework provides for synchronous remote interaction with a report. In FIG. 5 Alice was the dominant user—she specified a report to be viewed. In FIG. 6 Bob was the dominant user—he performed a drill down action on a portion of the report. There was no need for Alice to transfer control of the user interaction with the report to Bob. Bob as a participant in the instant messaging conversation can interact with the report. As shown in FIG. 7, Alice and Bob both have a synchronous view of the report, even though some of the user inputs to create the view were remote to their respective computers.

FIG. 7 also illustrates how the manipulation of a single report is displayed in separate reports. For example, using a cursor on screen 704, Bob selects a section of the report and it is highlighted for both Alice in block 706-A and Bob in block 706-B. In addition, Alice or Bob can attach a comment to the report that can be viewed by both of them.

Figure 8:
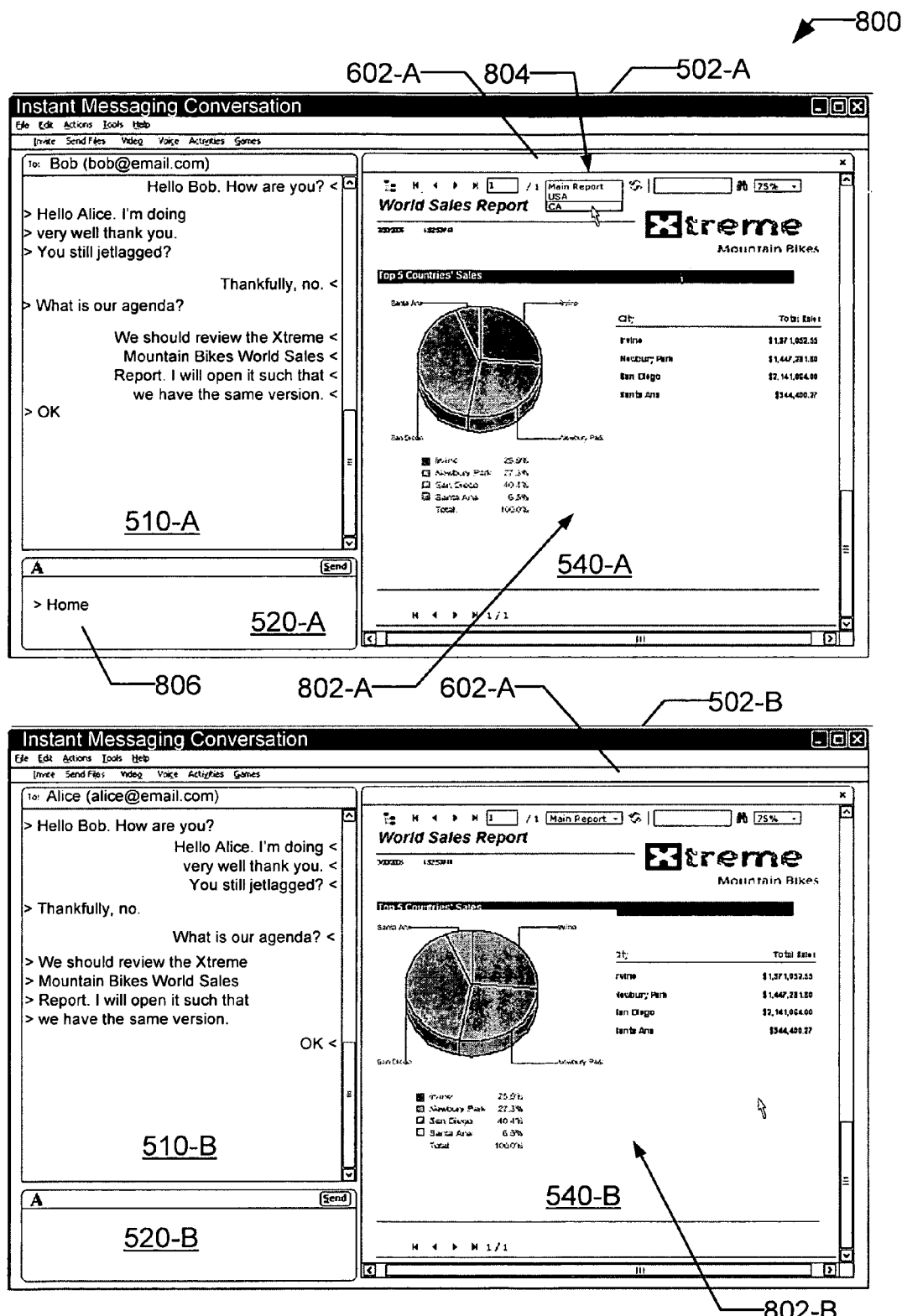
FIG. 8 illustrates a workflow involving the GUIs of FIG. 5.

FIG. 8 illustrates a workflow involving the GUIs of FIG. 5. Either Alice or Bob have made a user input that specifies a new view of the report 802. Alice now wants her and Bob to view another portion of the report. Alice then selects a view to return to from a list of previous views 804. The list of previous views is stored by the instant messaging module to permit such reverse navigation. Alternatively, Alice can type a command into the input panes 520-A. For example, Alice can type "Home" 806. In an embodiment, other commands relating to navigation are possible and these can be preceded by a code prefix such that the instant messaging system can parse them out, e.g., "#home", "#back". Once at the home screen Alice or Bob can initiate a search, or open another report. In an embodiment, Alice and Bob can have more than one report open and navigate between them.

Figure 9:
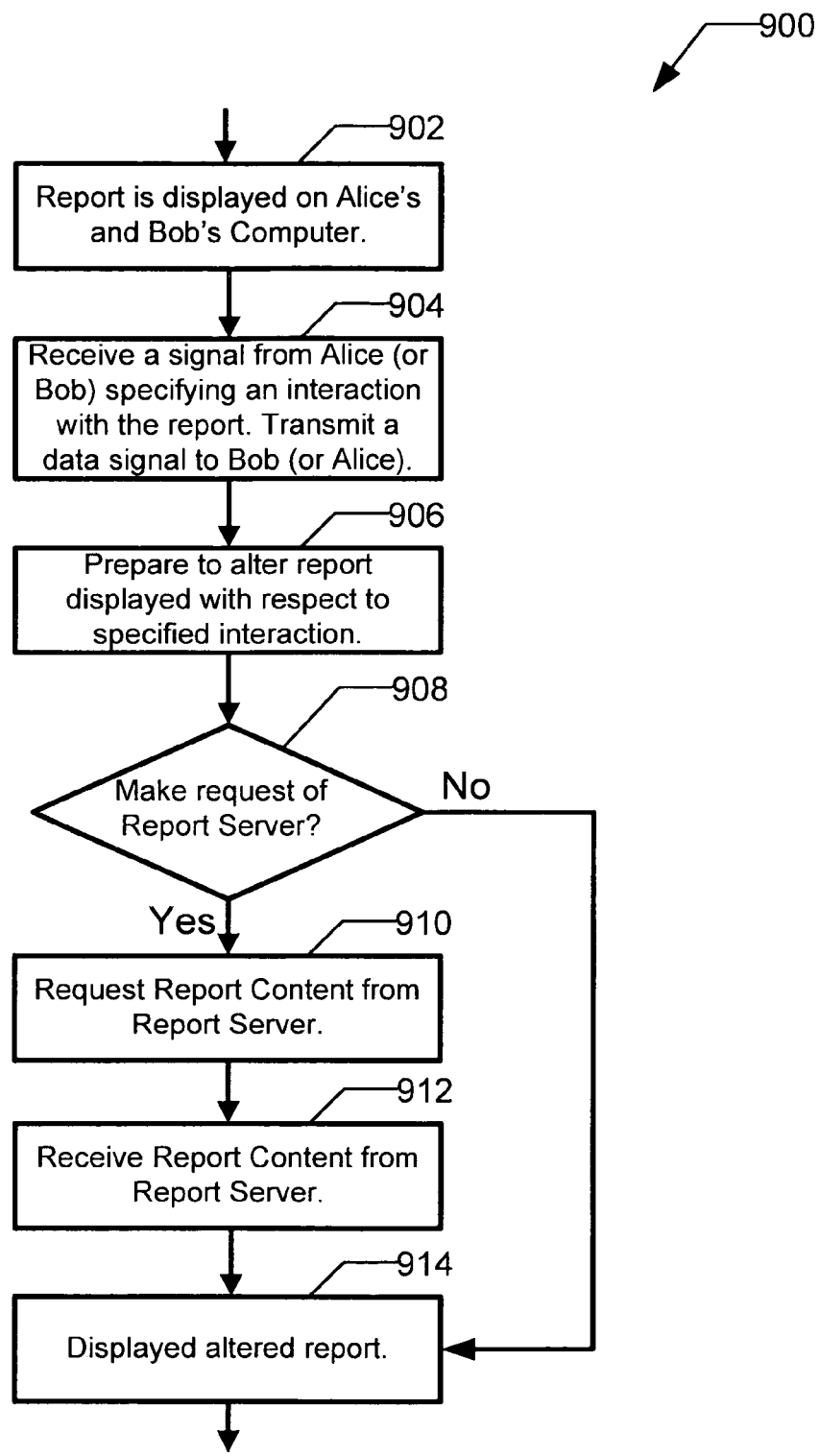
FIG. 9 illustrates a series of processing operations associated with an embodiment of the invention.

FIG. 9 illustrates a series of processing operations associated with an embodiment of the invention. In the first processing operation of FIG. 9, a portion of a report is displayed on the output devices of Alice's and Bob's computers 902. In processing operation 904, Alice's computer receives a signal specifying an interaction with the report. A data signal including the specification of the report interaction is sent to Bob, by the instant messaging module 116 on Alice's machine. In an embodiment, Alice's and Bob's roles are reversed.

In processing operation 906, each of Alice and Bob's computers prepares to alter the view of the report displayed with respect to the specified interaction. Each computer queries whether it needs to make a request for report content from the report server 908. In the case of 908-No, the computer processes the report and report interaction specification and displays the new view of the report as specified by the report interaction 914. In the case of 908-Yes, the computer requests report content from the report server 910. The computer then receives the report content from the server 912. Then the computer processes the report and report interaction specification and displays the new view of the report as specified by the report interaction 914.

The actions of Alice and Bob, that can lead to a request for report content from the server include, opening a report, paging down, drilling down on an item in the report, and navigating back to a report view previously seen. These actions are shown in FIGS. 6, 7, and 8. Alice or Bob could alter the view of the report by searching through a report. When viewing a document, Alice and Bob may wish to filter the data in order to show the information that is of most interest to them. For example, the report they are viewing contains sales data for all sales regions. Alice or Bob can specify a report parameter to filter the report to see only the regions of interest. Alice or Bob may specify regions by performing a search, a drill down, or by changing parameter values in the report. The last method has some advantages because if a region is specified all values effected by that region can be displayed. Performing a search, a drill down, and changing a parameter are examples of operations that lead to database operations.

Figure 10:
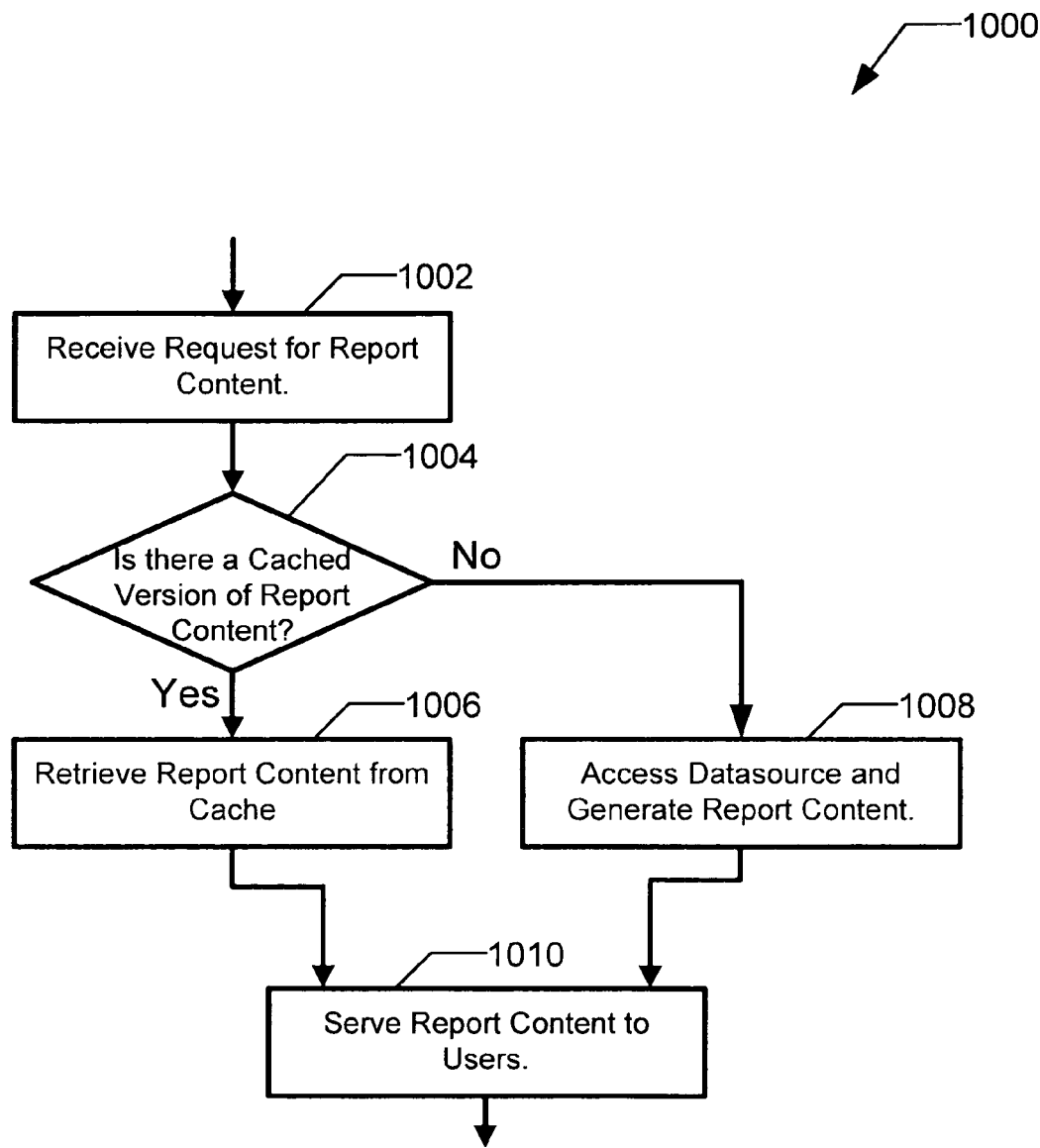
FIG. 10 illustrates a series of processing operations associated with an embodiment of the invention.

FIG. 10 illustrates a series of processing operations associated with an embodiment of the invention. In the first processing operation of FIG. 10, a report server, e.g., 220 of FIG. 2, receives a request for report content 1002. The report server processes the request and determines if a cached version of the report has the report content 1004. In the case of 1004-Yes, the report server retrieves the requested report content from the cache 1006. In the case of 1004-No, the report server executes a query against the data source, e.g., 222 of FIG. 2, and generates the report content 1008. The report content is served up to the users 1010.

There are some report interactions that require the report server to generate report content. In some cases the report server refreshes the report—that is, executes a query against the data source(s)—to get the latest snapshot of data. In some cases the report server can re-organize data, transform data, or generate new data, e.g., sums or percentages.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions, such as executing a query against a database.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
    sending a request for report content to a report server, wherein the report server generates and controls access to reports, wherein each report includes information automatically retrieved from a data source, where the information is structured in accordance with a report schema that specifies the form in which the information should be presented;
    processing the request for the report content at the report server;
    serving the report content to a first computer and a second computer;
    displaying a first view of the report content on a first output device of the first computer and a second output device of the second computer, wherein the first view is displayed adjacent to a panel display of an instant messaging conversation between a first user of the first computer and a second user of the second computer;

transmitting a signal specifying a second view of the report content via an instant messaging protocol; and displaying the second view of the report content on the first output device of the first computer and the second output device of the second computer.

2. The method of claim 1 further comprising:

processing at the report server a report request corresponding to the signal specifying a second view of the report content; and routing the second view of the report content to the first output device of the first computer and the second output device of the second computer.

3. The method of claim 2 further comprising retrieving the second view of the report content from a storage device.

4. The method of claim 1 further comprising executing a query at the report server.

5. The method of claim 1, wherein the signal specifying a second view of the report content is selected from a selection operation, an attach comment operation, a navigation operation, a report piece manipulation operation, a drill down operation, a page up operation, a page down operation, a search operation, a database operation, a refresh operation, and a specification of a report parameter operation.

6. A non-transitory computer readable medium including executable instructions, comprising instructions to:

facilitate an instant messaging conversation between a first computer and a second computer on a network;

process at a report server a first request for a report specified by a user of the first computer, wherein the report server generates and controls access to reports, wherein each report includes information automatically retrieved from a data source, where the information is structured in accordance with a report schema that specifies the form in which the information should be presented;

return a first portion of the report to a first output device of the first computer and a second output device of the second computer;

display the instant messaging conversation between the user of the first computer and a second user of the second computer adjacent to the first portion of the report;

process at the report server an interaction signal characterizing an interaction with the first portion of the report to produce a second portion of the report; and route the second portion of the report from the report server to the first output device of the first computer and the second output device of the second computer.

7. The non-transitory computer readable medium of claim 6 further comprising executable instructions to cache the report in a storage device.

8. The non-transitory computer readable medium of claim 6 wherein the interaction signal is created by a user of the first computer or the second computer interacting with the first portion of the report.

9. The non-transitory computer readable medium of claim 6 wherein the interaction signal is selected from a selection operation, an attach comment operation, a navigation operation, a report piece manipulation operation, a drill down operation, a paging operation, a page up operation, a page down operation, a search operation, a refresh operation, and a specification of a report parameter operation.

10. The non-transitory computer readable medium of claim 6 further comprising instructions to retrieve the second portion of the report from a storage device.

11. The non-transitory computer readable medium of claim 6 further comprising instructions to process a query.

* * * * *